US012568095B2

(12) United States Patent 
Grover et al.

(10) Patent No.: US 12,568,095 B2 
(45) Date of Patent: Mar. 3, 2026

(54) USING MACHINE LEARNING TO IDENTIFY PHISHING, VISHING, AND DEEP FAKE ATTACKS

(71) Applicant: MICRO FOCUS LLC, Santa Clara, CA (US)

(72) Inventors: Douglas Max Grover, Rigby, ID (US); Michael F. Angelo, Houston, TX (US)

(73) Assignee: Micro Focus LLC, Santa Clara, CA (US)

( * ) Notice: Subject to any disclaimer, the term of this patent is extended or adjusted under 35 U.S.C. 154(b) by 117 days.

(21) Appl. No.: 18/209,633

(22) Filed: Jun. 14, 2023

(65) Prior Publication Data

US 2024/0422174 A1 Dec. 19, 2024

(51) Int. Cl. 
*H04L 9/40* (2022.01) 
*G06N 20/00* (2019.01)

(52) U.S. Cl. 
CPC ......... *H04L 63/1416* (2013.01); *G06N 20/00* (2019.01)

(58) Field of Classification Search 
CPC ............. H04L 63/1416; H04L 63/1441; H04L 63/1433; H04L 41/16; G06F 21/55; G06F 7/023; G06N 20/00; H04N 21/251; H04N 21/466; H04N 21/45; H04N 21/4662 
See application file for complete search history.

(56) References Cited

U.S. PATENT DOCUMENTS

| | | | |
|---|---|---|---|
| 8,839,369 B1 | 9/2014 | Dai | |
| 10,218,697 B2 * | 2/2019 | Cockerill | ............ H04L 63/0823 |
| 10,404,745 B2 | 9/2019 | Verma | |
| 11,588,830 B1 * | 2/2023 | Bilgrami | ............. H04L 63/1416 |
| 2005/0105712 A1 * | 5/2005 | Williams | .............. G10L 13/027 |
| | | | 704/275 |
| 2015/0067833 A1 | 3/2015 | Verma | |
| 2020/0067978 A1 * | 2/2020 | Jakobsson | ............... H04L 51/00 |
| 2021/0133742 A1 * | 5/2021 | Stephens | ............. H04L 63/1441 |
| 2022/0094709 A1 * | 3/2022 | Sharma | ............... G06F 18/2415 |
| 2022/0131978 A1 * | 4/2022 | Scott | ................. H04M 3/42068 |
| 2022/0141252 A1 * | 5/2022 | Shi | ......................... H04L 63/102 |
| | | | 726/22 |
| 2022/0210188 A1 | 6/2022 | Grewal | |
| 2023/0038671 A1 * | 2/2023 | Weber | ................... H04L 51/212 |
| 2024/0045990 A1 * | 2/2024 | Boyer | .................... G06F 40/20 |
| 2024/0403428 A1 * | 12/2024 | Lal | ....................... G06F 21/566 |

* cited by examiner

*Primary Examiner* — Michael Won 
(74) *Attorney, Agent, or Firm* — Sheridan Ross P.C.

(57) ABSTRACT

Language used by a specific user in a specific context is gathered. The language used by the specific user in the specific context is language gathered from a plurality of previously captured electronic communication sessions. For example, the language of the specific user is captured from previous voice, video, and/or text communication sessions. A machine learning process based on the language gathered from the plurality of previously captured electronic communication sessions is trained. The trained machine learning process is used to determine if the specific user is actually participating in an electronic communication session or if a potential imposter is likely posing as the specific user in the electronic communication session. In response to determining that the potential imposter is likely posing as the specific user in the electronic communication session, an action is taken to secure the electronic communication session.

20 Claims, 8 Drawing Sheets

USING MACHINE LEARNING TO IDENTIFY PHISHING, VISHING, AND DEEP FAKE ATTACKS

FIELD

The disclosure relates generally to detecting phishing, vishing, and deep fake attacks and particularly to securing electronic communication sessions based on detecting phishing, vishing, and deep fake attacks using machine learning.

BACKGROUND

Today, phishing attacks, vishing attacks, and deep fakes are constant and ever evolving. Sophisticated hackers are using ever creative ways to deceive someone into divulging information. The hackers can infiltrate communication networks by sending an email/voicemail using a legitimate email address/telephone number that appears to be from a known user (e.g., the user's email account was hacked, or the phone number was spoofed). This even applies to real-time communications, such as voice and video communication sessions. With AI services like ChatGPT, elegant emails and soficiated voicemails can appear even more authentic. As a result of these types of deception, network security can become compromised, and the divulged information can be used hack computer networks.

In addition, with large computer networks, trying to manually monitor millions of electronic communications each day in real-time is impossible. With the proliferation of so many different types of attacks and variances in each of these types of attacks, it is a never-ending threat to network/corporate security.

SUMMARY

These and other needs are addressed by the various embodiments and configurations of the present disclosure. The present disclosure can provide a number of advantages depending on the particular configuration. These and other advantages will be apparent from the disclosure contained herein.

Language used by a specific user in a specific context is gathered. The language used by the specific user in the specific context is language gathered from a plurality of previously captured electronic communication sessions. For example, the language of the specific user is captured from previous voice, video, and/or text communication sessions. A machine learning process based on the language gathered from the plurality of previously captured electronic communication sessions is trained. The trained machine learning process is used to determine if the specific user is actually participating in an electronic communication session or if a potential imposter is likely posing as the specific user in the electronic communication session. In response to determining that the potential imposter is likely posing as the specific user in the electronic communication session, an action is taken to secure the electronic communication session.

The phrases "at least one", "one or more", "or," and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate" and "compute," and variations thereof, as used herein, are used interchangeably, and include any type of methodology, process, mathematical operation, or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Figure 1:
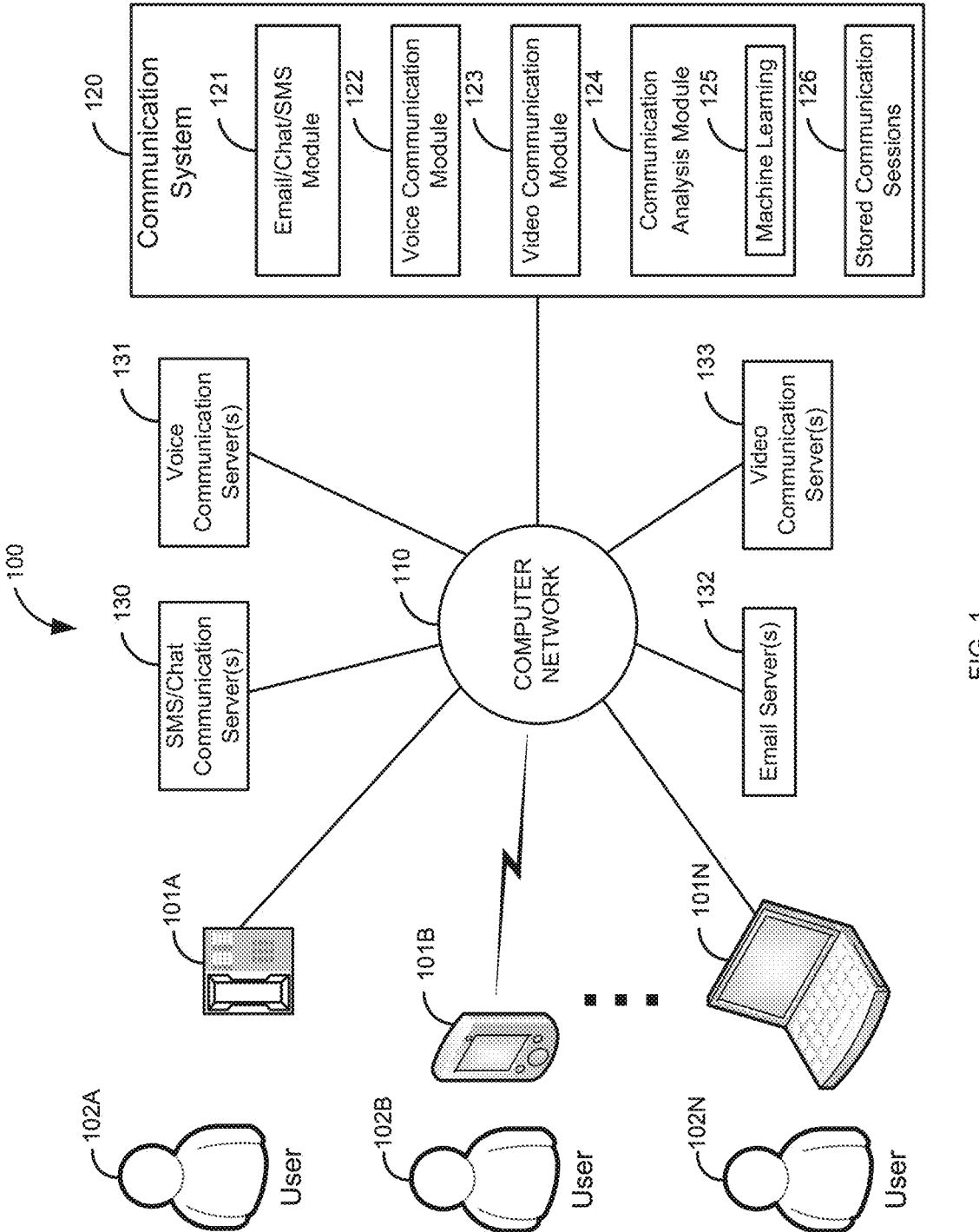
FIG. 1 is a block diagram of a first illustrative system for identifying phishing, vishing, and deep fake attacks on a computer network.

FIG. 1 is a block diagram of a first illustrative system 100 for identifying phishing, vishing, and deep fake attacks on a computer network 110. The first illustrative system 100 comprises communication devices 101A-101N, the computer network 110, a communication system 120, SMS/Chat communication server(s) 130, voice communication server(s) 131, email server(s) 132, and video communication server(s) 133.

In addition, users 102A-102N are shown for convenience. The users 102A-102N are users of the communication devices 101A-101N.

The communication devices 101A-101N can be or may include any user device that can communicate on the network 110, such as a Personal Computer (PC), a telephone, a video system, a cellular telephone, a Personal Digital Assistant (PDA), a tablet device, a notebook device, a smartphone, a smart watch, and/or the like. As shown in FIG. 1, any number of communication devices 101A-101N may be connected to the network 110.

The computer network 110 can be or may include any collection of communication equipment that can send and receive electronic communications, such as the Internet, a Wide Area Network (WAN), a Local Area Network (LAN), a packet switched network, a circuit switched network, a cellular network, a combination of these, and the like. The computer network 110 can use a variety of electronic protocols, such as Ethernet, Internet Protocol (IP), Hyper Text Transfer Protocol (HTTP), Web Real-Time Protocol (Web RTC), and/or the like. Thus, the computer network 110 is an electronic communication network configured to carry messages via packets and/or circuit switched communications.

The communication system 120 may be any type of communication system that can provide electronic communication sessions/services on the computer network 110. The communication system 120 allows the user 102 to establish communication sessions with the communication devices 101A-101N, the SMS/Chat communication server(s) 130, the voice communication server(s) 131, the email server(s) 132, and/or the video communication server(s) 133.

The communication system 120 further comprises email/chat/Short Message Service (SMS) module, a voice communication module 122, a video communication module 123, a communication analysis module 124, and stored communication sessions 126. The email/chat/SMS module 121 can be or may include any hardware/software that can manage/send/receive emails, chats, and SMS messages for the users 102A-102N.

The voice communication module 122 can be or may include any hardware coupled with software that can manage/switch/control voice communications for the users 102A-102N, such as, a central office switch, a Private Branch Exchange (PBX), a communication server, and/or the like. The voice communication module 122 may comprise a voice mixer (not shown).

The video communication module 123 can be or may include any hardware coupled with software that manage/switch/control video communications for the users 102A-102N, such as, a video switch, a PBX, a communication server, and/or the like. The video communication module 123 may also have an audio mixer to mix voice of the video communication sessions.

The communication analysis module 124 can or may include any hardware coupled with software that can analyze electronic communications. For example, the communication analysis module 124 can analyze text communications (e.g., email, chat, SMS), voice communications, and/or video communications.

The communication analysis module 124 further comprises machine learning 126. The machine learning 126 can be any type of machine learning, such as, supervised machine learning, semi-supervised machine learning, unsupervised machine learning, reinforced machine learning, and/or the like. The machine learning 126 is used to analyze user communications for individual users 102.

The SMS/Chat communication server(s) 130 are communication server(s) that can manage/send/receive chats/SMS messages between different communication devices 101A-101N. The SMS/Chat communication server(s) 130 may work in conjunction with the Email/Chat/SMS module 121 to send SMS/Chat messages across the computer network 110.

The voice communication server(s) 131 are communication server(s) that can manage/send/receive voice communications between different communication devices 101A-101N on the computer network 110. The voice communication server(s) 131 may work in conjunction with the voice communication module 122 to send voice communications across the computer network 110.

The email communication server(s) 132 are communication server(s) that can manage/send/receive email communications between different communication devices 101A-101N on the computer network 110. The email communication server(s) 132 may work in conjunction with the email/chat/SMS module 121 to send email communications across the computer network 110.

The video communication server(s) 133 are communication server(s) that can manage/send/receive video communications and their accompanying voice data between different communication devices 101A-101N on the computer network 110. The video communication server(s) 133 may work in conjunction with the video communication module 123 to send video communications across the computer network 110.

Figure 2:
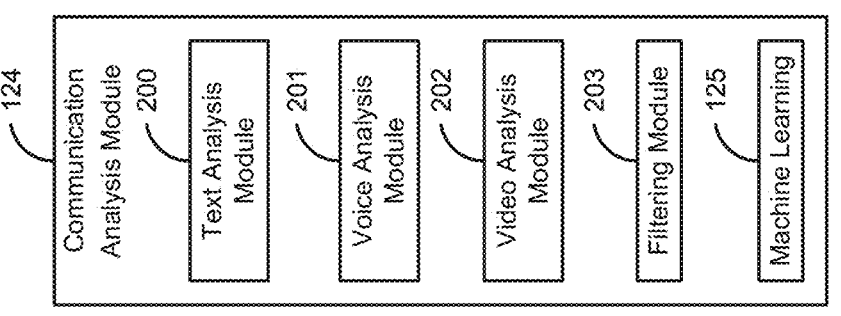
FIG. 2 is a block diagram of an exemplary communication analysis module that is used for identifying phishing, vishing, and deep fake attacks on a computer network.

FIG. 2 is a block diagram of an exemplary communication analysis module 124 that is used for identifying phishing, vishing, and deep fake attacks on the computer network 110. FIG. 2 provides an exemplary expanded view of the communication analysis module 124. In FIG. 2, the communication analysis module 124 comprises a text analysis module 200, a voice analysis module 201, a video analysis module 202, a filtering module 203, and the machine learning 125.

The text analysis module 200 is used to analyze text communications from a specific user 102 in a specific context. For example, the context may be for emails, for chats, for SMS messages, for voice converted to text, and/or the like. The context could be refined further. For example, a first context for the user 102A could be for email communications between the user 102A and the user 102X, and a second context could be email communications between the user 102A and the user 102Y.

The text analysis module 200 uses the machine learning 125 to determine various characteristics associated with the language in the text being processed. For example, the text analysis module 200 may use Bayesian analysis to determine if the email/chat/SMS comes from a specific location, region, and/or user 102. The Bayesian analysis can look at the sentence structure, style of the email, words used, etc. If the user 102 has specific sentence patterns/word usage (uses a specific word versus another synonym), this may be compared to an incoming email/chat/SMS (a context) in real-time from that user 102 to identify if the sentence patterns/word usage is similar. The text analysis may consider things like acronyms previously used by the user 102 and/or the use of new words by the user 102 in the context (e.g., the user 102 may use different words/structure for an email versus a SMS). If all of a sudden, the user 102 is spelling out all the acronyms where the user 102 previously did not, the text analysis module 200 could flag this using a threshold. If the user 102 is now using words previously not used or from a different dialect (e.g., unique Australian words verses unique US English words), this may indicate that the email is a phishing email/chat/SMS.

The patterns could include a lack of usage. For example, the patterns may be based on a lack of use of specific words by the specific user, a lack of acronyms used by the specific user, a lack of profanity used by the specific user, a lack of emojis by the specific user, a lack of the use of a signature, a lack of use of the attachments, and/or the like.

The patterns could consider the context of who else is on the email/SMS/Chat. For example, the user 102 may use different verbiage/acronyms/sentence structure depending on who the user 102 is conversing with. For example, the user 102 may use different language (e.g., no profanity) when conversing with a family member versus a work acquaintance or boss. This information would be another factor to better identify a potential phishing email/chat/SMS.

The text analysis could be based on a country/dialect. For example, if the email should have a sentence/word structure commonly found from people who are native to England (e.g., the user 102 is supposed to be from England), but the structure is more like those seen by someone from India where English is not their native language, the email could be flagged as a likely phishing email/chat/SMS and/or this could be another factor for identifying a phishing email. The language structure could be used to identify a likely source country/content of the who originated the email based on training the machine learning 125. Moreover, if the email/chat/SMS suddenly became perfect for a specific region, the process would detect the email/chat/SMS as likely being generated by an Artificial Intelligence (AI) algorithm or language generator.

The voice analysis module 201 is used to analyze voice communications from a specific user 102 in a specific context. A voice context could be based on who the user 102 is talking to or all voice communications. Another voice context could be for voicemails. The user 102 may use different language when leaving voicemails versus conversing in a voice communication session or in a voice communication session with a specific person(s).

The voice analysis could extend to real-time voice and/or real-time voice of a video communication session. To detect deep fakes, other factors may be used, such as, how often does the user 102 speak in a conversation (e.g., is the user 102 more of an introvert versus an extravert), how the user 102 speaks based on who is on the communication session (a context of how the user 102 speaks to individual users 102), etc. The machine learning 125 can start analyzing a voice conversation in real-time to detect the variances and indicate to another user 102 on the communication session and/or administrator that a party on the communication session may be a likely imposter. Another other user 102 on the communication session may be provided options on how to deal with the communication session, such as dropping the suspect user 102 from the communication session. If there are multiple users 102, only the legitimate users 102 may be notified. In addition, the suspect user 102 may be asked to authenticate using one or more authentication credentials based on one or more rules in in regard to a security level of the electronic communication session.

The video analysis module 202 is used to analyze video communications from a specific user 102 in a specific context. A video context could be based on who the user 102 is communicating with in the video communication session. Another voice context could be for videomails. The user 102 may use different gestures/facial expressions when leaving a videomail versus conversing in a video communication session or in a video communication session with a specific person(s). For example, the video analysis could be applied to a fake videomail. All the same machine learning techniques for phishing emails may be used for a fake videomail. For example, the machine learning 125 could be trained based on previous voice conversations (or even written conversations) by the user 102 to learn similar sentence structure, word usage, acronym usage etc. In addition, other voice factors may be used, such as, voice patterns, inflections, sarcasm, accent, loudness, softness, how quickly/slowly does the user 102 speak, and/or the like.

The machine learning 125 could also be applied to video communication sessions and include gestures (e.g., if a AI generated user is displayed), mannerisms (e.g., does the user 102 move their head in a specific manner, touch their face in a specific way, etc.), facial motion, the way the user 102 looks when the user 102 says a specific words, micro expressions, changes to the user's face over time (e.g., did the user 102 just get a haircut, but the image shows not having the haircut, does the user 102 currently use glasses, but now does not, etc.), and/or the like The user's visual patterns could be identified and compared in real-time to the actual expressions/mannerisms to identify a real-time a deep fake attack. Like above, the suspect user 102 may be asked to provide one or more authentication credentials based on rules on how secure the video communication session is or based on rules on how the other users 102 on the video communication session should be notified.

Figure 3:
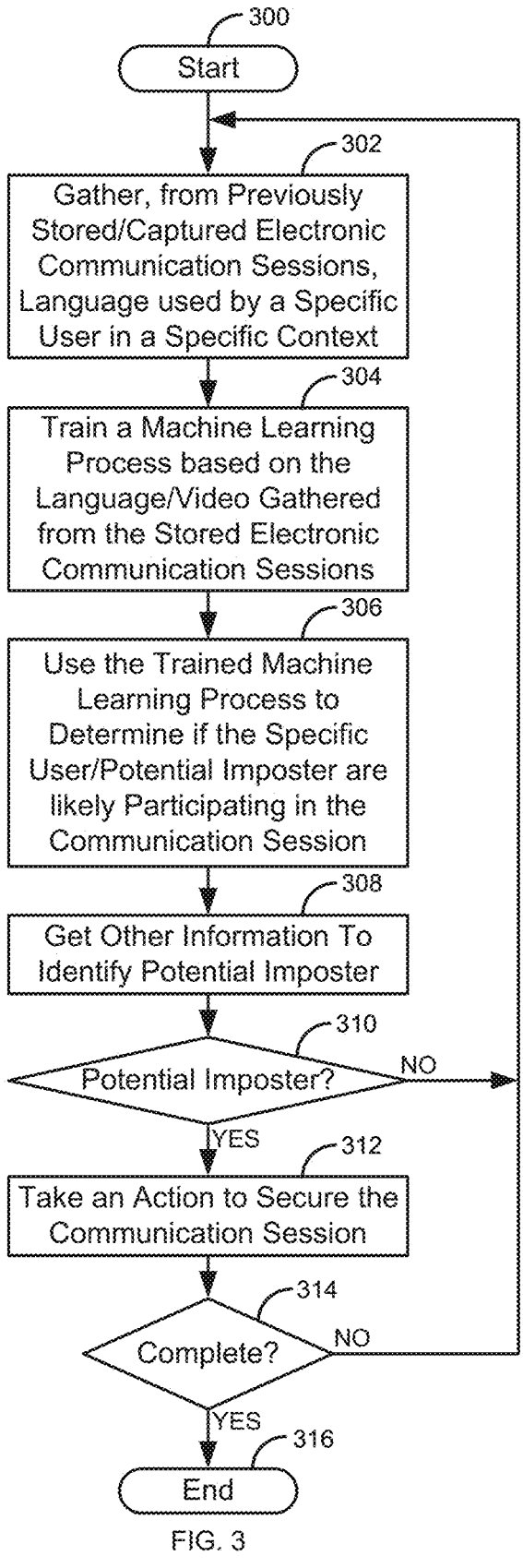
FIG. 3 is a flow diagram of a process for identifying phishing, vishing, and deep fake attacks on a computer network.

FIG. 3 is a flow diagram of a process for identifying phishing, vishing, and deep fake attacks. Illustratively, the communication devices 101A-101N, the communication system 120, the email/chat/SMS module 121, the voice communication module 122, the video communication module 123, the communication analysis module 124, the machine learning 125, the SMS/chat communication server(s) 130, the voice communication server(s) 131, the email communication server(s) 132, the video communication server(s) 133, the text analysis module 200, the voice analysis module 201, the video analysis module 202, and the filtering module 203 are stored-program-controlled entities, such as a computer or microprocessor, which performs the method of FIGS. 3-8 and the processes described herein by executing program instructions stored in a computer readable storage medium, such as a memory (i.e., a computer memory, a hard disk, and/or the like). Although the methods described in FIGS. 3-8 are shown in a specific order, one of skill in the art would recognize that the steps in FIGS. 3-8 may be implemented in different orders and/or be implemented in a multi-threaded environment. Moreover, various steps may be omitted or added based on implementation.

The process starts in step 300. The communication analysis module 124 gathers, in step 302, from the stored (captured) communication sessions 126, language used by a specific user 102 in a specific context. The specific context may be based on the type of communication, who is on the communication, and/or the like. The communication analysis module 124 trains, in step 304, the machine learning 125 based on the language/video gathered from the stored electronic communications 126. For example, if the context is for a specific user 102 (e.g., 102A) communicating with a second user (e.g., 102N) in voice communication sessions, the machine learning 125 will be trained with voice communication sessions where the second user 102N is in the voice communication sessions with the specific user 102A. If the context is for the specific user 102A for SMS messages, the machine learning 125 will be trained with SMS messages sent by the specific user 102A. If the context is for the specific user 102A in video communication sessions, the machine learning 125 will be trained using video communication sessions for the specific user 102A. The training process can be completed for multiple users 102A-102N. For example, the stored communication sessions 126 may comprise communication sessions for ten of thousands of users 102A-102N on a large corporate computer network 110.

The communication analysis module 124 uses the trained machine learning process, in step 306, to determine if the specific user 102/potential imposter is likely participating the communication session. The communication analysis module 124 gets other information to identify the potential imposter in step 308. For example, when an email is received, the headers associated with the email indicate a specific path of email servers, IP addresses, etc. This may vary based on where the user 102 resides when sending an email. The path of email servers 132 may be different if the user 102 is working from home, is working in-office, or working in another country. Below is a set of email servers that were used in an exemplary email message.

Received: from SJ0PR18MB4834.namprd18.prod.outlook.com (2603: 10b6:a03:401::20) by MW5PR18MB5065.namprd18.prod.outlook.com with HTTPS; Tue, 21 Mar. 2023

Received: from SN1PR18MB2319.namprd18.prod.outlook.com (2603:10b6:802:31::27) by SJ0PR18MB4834.namprd18.prod.outlook.com (2603: 10b6:a03:401::20) with Received: from SN1PR18MB2319.namprd18.prod.outlook.com ([fe80::984c:433:3414:ff7]) by SN1PR18MB2319.namprd18.prod.outlook.com ([fe80::984c:433:3414:ff7%5]) with mapi id 15.20.6178.037; Tue, 21 Mar. 2023 15:16:26+0000

If the email is sent from locations that are not typical for a specific user 102 (e.g., the ones used for home/work), this information may also be used to help determine if the email is a phishing email. For example, if the user 102 all of a sudden uses an email server 132/IP address in another country/location than previously, this can be one factor to help identify a potential phishing email. The information could be tied to the user's calendar to see if the user 102 could be out of the office and in another country. In addition, other email server properties, such as, server IDs, addresses, mapi ids, etc. can be used to identify variances. The process could be implemented even where the email address is not the user's normal email address. If the address is suddenly different, this could be one of the factors used to determine the probability of a phishing email.

In addition, images and/or signatures may be looked at in step 308. For example, if the user 102 normally has a signature/image at the end of their work emails, if that is now missing this would be another factor to identify a potential phishing email. Moreover, things like emoji use could be used to identify different patterns in how the user 102 uses emojis in emails/chats/SMS. This can include what emojis the user 102 uses with different people (e.g., a family member versus a boss at work). If the user 102 normally includes an image or emoji in certain types of emails/all emails (or chats/SMS), this may be another factor.

In step 308 the context of the email/chat/SMS may be machine learned by training a machine learning algorithm using known phishing emails/chats/SMS. Thus, similar contexts may be identified in the phishing emails/chats/SMS (e.g., an account hack context, a money transfer hack, etc.).

For example, if the email/chat/SMS is similar to known phishing text communications, this may be another factor used to identify a potentially malicious text/voice communication session.

The input to the machine learning 125 that is used to identify potential imposters, in step 308, may have examples that are based on AI systems, such as chatGPT. If the text of the communication session has a similar sentence structure/ word usage as used by chatGPT, this can be identified and used as another factor to identify a potentially malicious text communication session.

Other factors, such as attachments may be used in the analysis. For example, if there is an attachment, the context of the attachment may be used as another factor to help identify a phishing attack. In addition, things like text links may be analyzed as part of the analysis. For example, the website in the link may be analyzed as another factor to help determine if an email is legitimate or not.

Moreover, other factors may be used in step 308, such as phone numbers, Session Initiation Protocol (SIP) identifiers, Globally Unique Identifier (GUID), Internet Protocol (IP) addresses, Media Access Control (MAC) addresses, etc. For example, if the SIP identifier for the user 102 changes, this could be flagged that an imposter is likely posing as the user 102. All the above factors can be used to create a threshold for determining a potential imposter.

The communication analysis module 124 determines, in step 310, if there is a potential imposter. For example, the communication analysis module 124 may determine based on the information determined in step 306-308 if there is a potential imposter involved in the communication session. If it is determined that there is not a potential imposter on the communication session, the process goes back to step 302. In one embodiment, the process could go back to step 306 (skipping the machine learning process).

Otherwise, if it is determined, in step 310, that there is likely a potential imposter in the communication session, an action is taken to secure the communication session. For example, a warning message could be displayed to the user 102 that the user 102 who sent the email is a likely an imposter. The warning message could say that the user 102 who sent the email is now in Russia where normally they are in the US and the person who drafted the email is likely from Russia based on the sentence structure analysis. The warning could indicate other specific examples of why this is likely a phishing email. For example, it could point out that the email server address changed, that the sentence structure being used is different (e.g., show a comparison from a previous email to this email), indicate new words used, not having a signature, different emoji use, etc.

Additional options for step 312 may be where an administrator may be notified and be given the option to block, quarantine, and/or deny responding to the email/chat/SMS. Emails/chats/SMS may even be automatically deleted or to sent to a quarantine area/junk mail (including the analysis). The process could be tied to multifactor authentication based on the context of the communication session. For example, if an email is asking to send monies to an account, to approve responding, an administrator may have to provide level two authentication (e.g., by providing a username/ password and SMS code) to approve the user 102 responding to the email. Thus, the email history can be tracked along with how someone responded. Instead of an administrator approval, the user 102 may have to sign in at an authentication level and state that they have looked at the email and verified it is from a valid source (e.g., the user 102 called the sender of the email to verify that the email is valid) before the email is released and the user 102 is allowed to respond to the email.

The communication analysis module 124 determines, in step 314, if the process is complete. If the process is not complete in step 314, the process goes back to step 302 (or optionally step 306). Otherwise, if the process is complete in step 314, the process ends in step 316.

Figure 4:
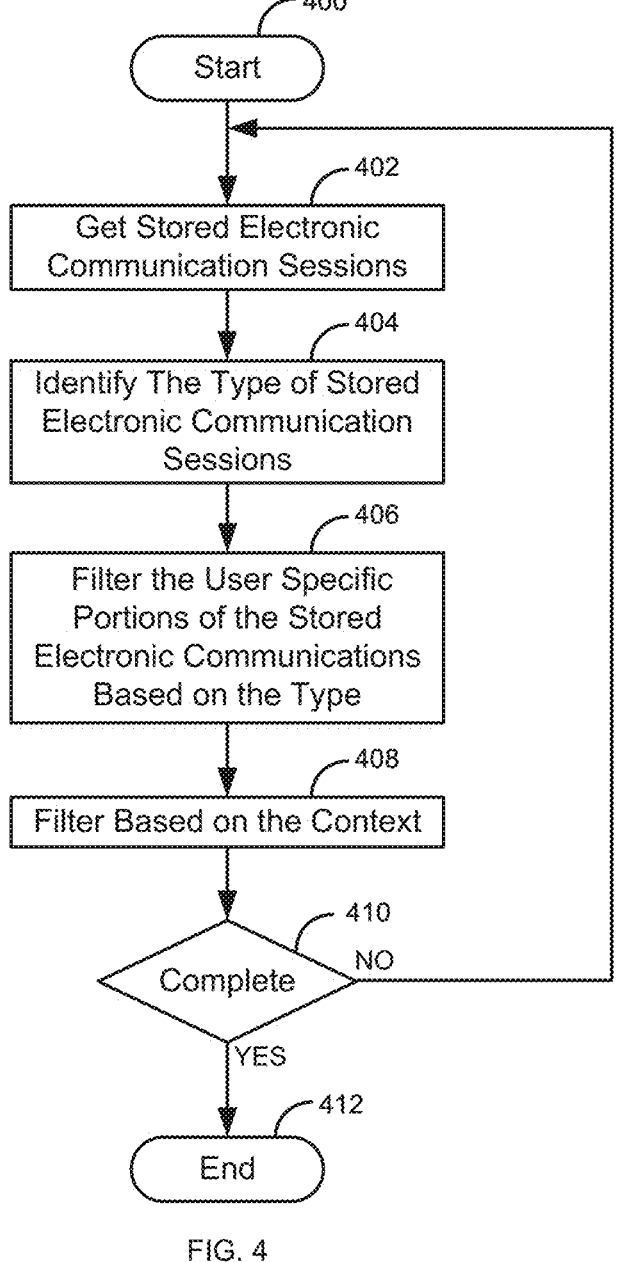
FIG. 4 is a flow diagram of a process for filtering user specific portions of electronic communication sessions.

FIG. 4 is a flow diagram of a process for filtering user specific portions of stored electronic communication sessions 126. The process starts in step 400. The filtering module 203 gets the stored electronic communication sessions 126 in step 402. The filtering module 203 identifies the type of stored electronic communication sessions in step 404. For example, the filtering module 203 determines that a specific electronic communication session is an email, chat, SMS, voice, video, etc.

The filtering module 203 filters out the user specific portions of the stored electronic communication sessions 126 in step 406. For example, if the electronic communication session is an email, the filtering module 203 can filter based on the From: field in the email. A similar process can be used for SMS/chat. For voice/video communication sessions, things like IP address/SIP address, telephone numbers etc. can be used to identify audio/video from a specific user 102. For example, the user specific data is filtered based on the IP address where the voice/video data came from. Another way to filter data may be based on voiceprints of the user 102 for audio and faceprints of the user 102 for video.

The filtering module 203 filters based on the context in step 408. For example, the filtering module 203 may filter based on what specific users 102 are in a text communication session, a voice communication session, or video communication session. If the context is a voice communication session between the user 102A (the specific user 102) and the user 102N, the voice communication sessions where the user 102N is not involved will be filtered out.

The filtering module 203 determines, in step 410, if the process is complete. If the process is not complete in step 410, the process goes back to step 402 to start filtering for the next context. Otherwise, if the process is complete in step 410, the process ends in step 412.

Figure 5:
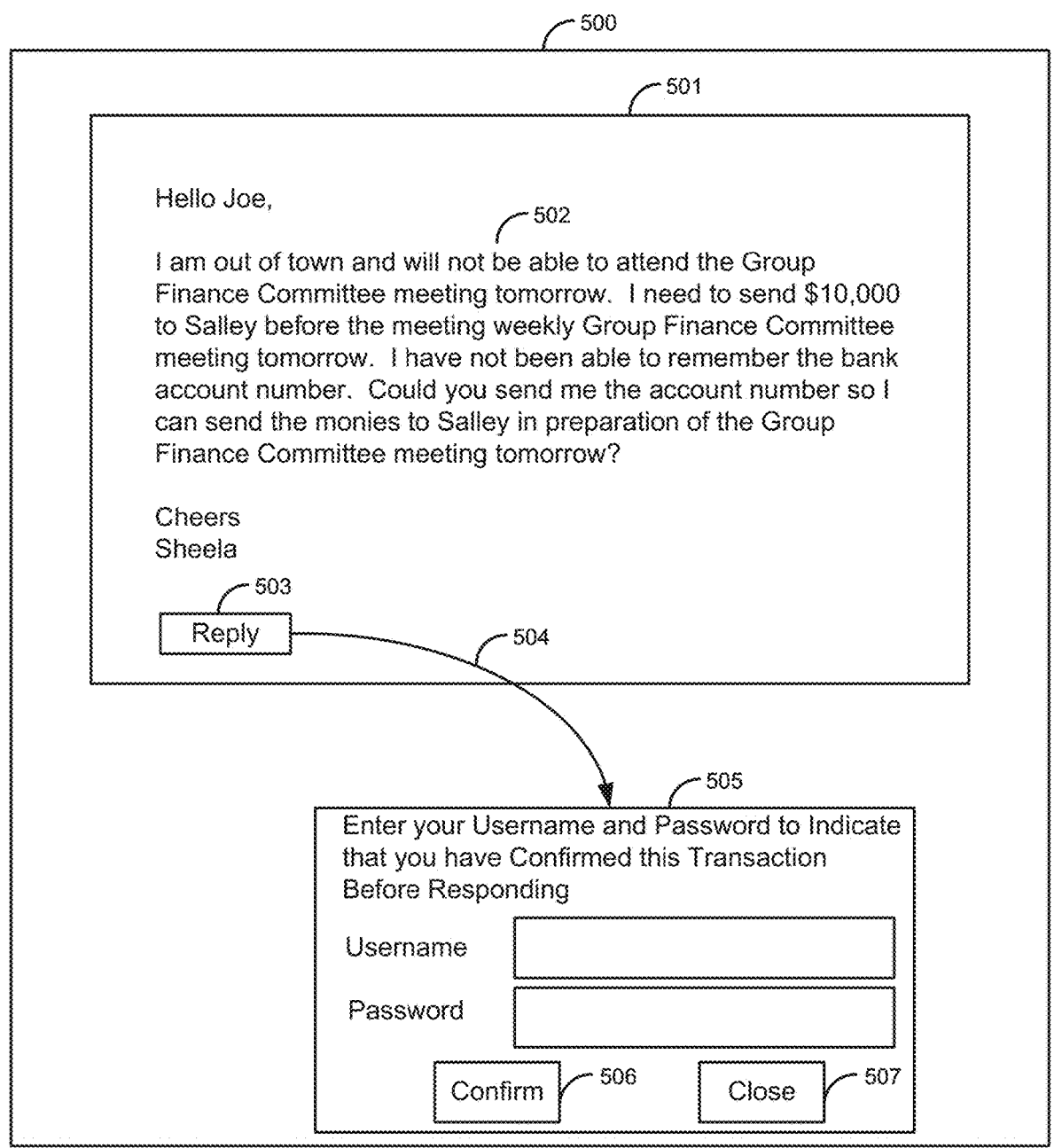
FIG. 5 is a diagram of an example of a potential phishing email where a user is required to authenticate in order to respond to the potential phishing email.

FIG. 5 is a diagram of an example of a potential phishing email 501 where a user 102 is required to authenticate in order to respond to the potential phishing email 501. FIG. 5 comprises a Graphical User Interface (GUI) 500. The GUI 500 comprises the potential phishing email 501 and an authentication window 505. The potential phishing email 501 comprises a message body 502 and a reply button 503.

The potential phishing email 501 from the user 102 (Stella) has several issues that make it a likely potential phishing email. For example, the user 102 (Stella) never uses the word "Hello" when talking to Joe (uses "Hi" instead), the message body 502 of the email 501 is similar to other phishing emails, in the email 501, the user 102 (Stella) uses the term "monies" where the user 102 (Stella) normally uses the word "money," the user 102 (Stella), instead of normally using the acronym GFC, uses the term "Group Finance Committee," the user 102 (Stella) normally has a signature at the end of the message body 502 where the potential phishing email 501 does not, and the potential phishing email 501 is coming from a new email server 132. All of this taken together is used to flag this as a potentially phishing email 501.

After identifying that the email is a potential phishing email 501 from an imposter, when the user 102 tries to reply to the potential phishing email 501 by clicking on the reply button 503, in step 504, the authentication window 505 is displayed to the user 102. The authentication window 505 requires the user 102 to enter their username and password. In this example, the user 102 has to confirm that the email is legitimate by clicking on the confirm button 506 after entering a valid username/password. Once the user 102 clicks on the confirm button 506 with a valid username/password, the user 102 can then reply to the potential phishing email 501.

Otherwise, if the user 102 cannot confirm that the potential phishing email 501 is legitimate, the user 102 clicks on the close button 507. If the user 102 clicks on the close button 507, the user 102 will not be able to reply to the potential phishing email 501. Although not shown, another option on the authentication window 505 would be to delete the potential phishing email 501 where the authentication window 505 also has a delete button (not shown).

Figure 6:
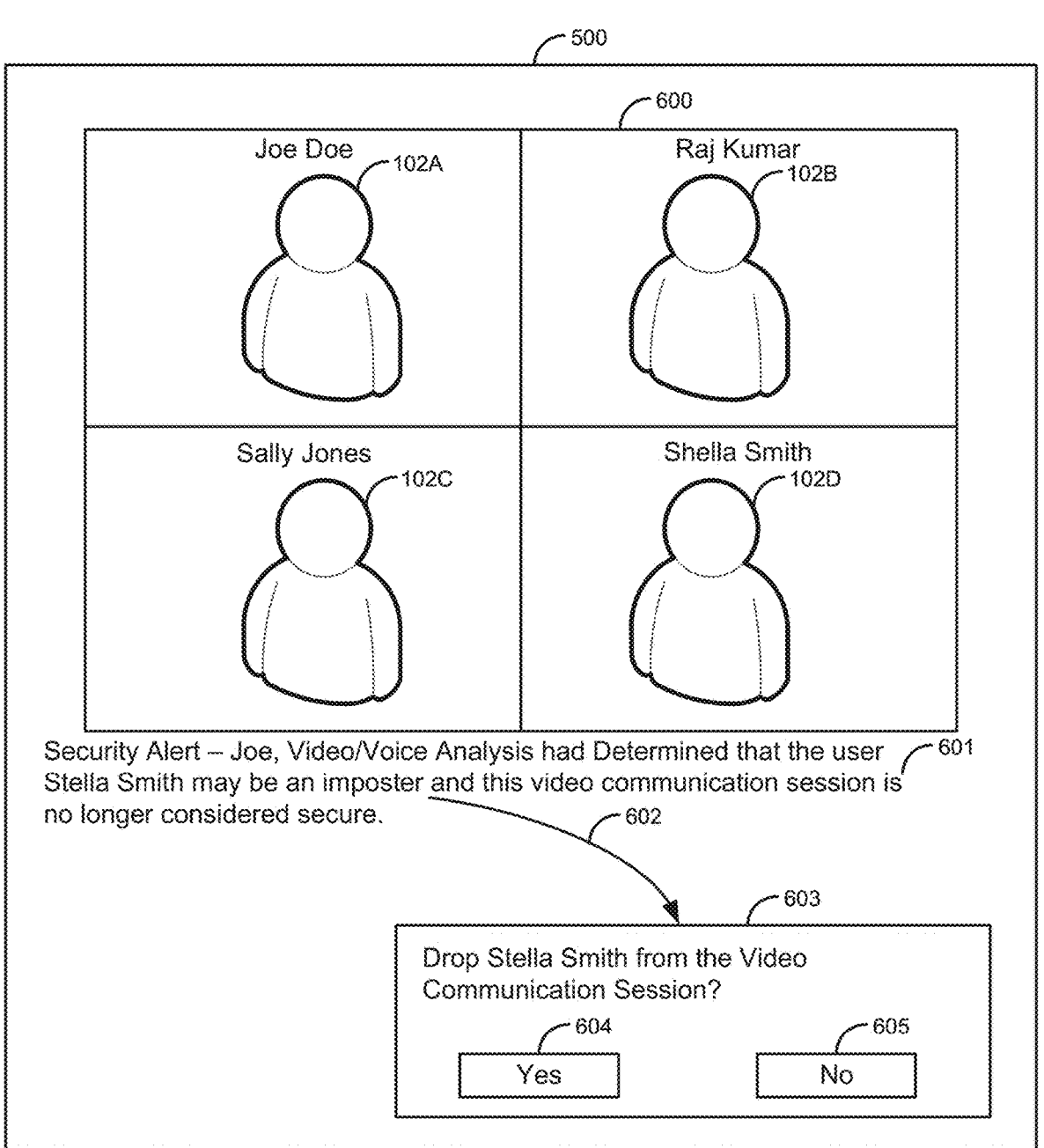
FIG. 6 is a diagram of a graphical user interface for a video communication session where a user is notified of a potential deepfake attack and can drop a potential imposter from the video communication session.

FIG. 6 is a diagram of a Graphical User Interface (GUI) 500 for a video communication session 600 where a user 102 is notified of a potential deepfake attack and the user 102 can drop a potential imposter from the video communication session 600. In FIG. 6, the GUI 500 comprises a video communication session 600, a security alert message 601, and a drop user window 603.

The video communication session 600 of FIG. 6 comprises four users: Joe Doe 102A, Raj Kumar 102B, Sally Jones 102C, and Stella Smith 102D. The video communication session 600 is displayed to the user Joe Doe 102A. The communication analysis module 124 has determined that the user Stella Smith 102D may be an imposter (e.g., using the process described in FIG. 3) and as a result has displayed the security alert message 601. The security alert message 601 tells user Joe Doe 102A that the voice/video analysis has determined that the user Stella Smith 102D may be an imposter and that the video session is no longer considered secure.

In addition, the drop user window 603 has been displayed to the user Joe Doe 102A in step 602 based on the analysis. The drop user window 603 allows the user Joe Doe 102A to drop the user Stella Smith 102D from the video communication session 600 by clicking on the yes button 604. If the user Joe Doe 102A does not want to drop the user Stella Smith 102D from the video communication session 600, the user Joe Doe 102A can click on the no button 605.

The security alert message 601 and the drop user window 603 may also be displayed to the user Raj Kumar 102B and the user Sally Jones 102C. In this example, the users Raj Kumar 102B and Sally Jones 102C will also be able to drop the user Stella Smith 102D from the video communication session 600.

Figure 7:
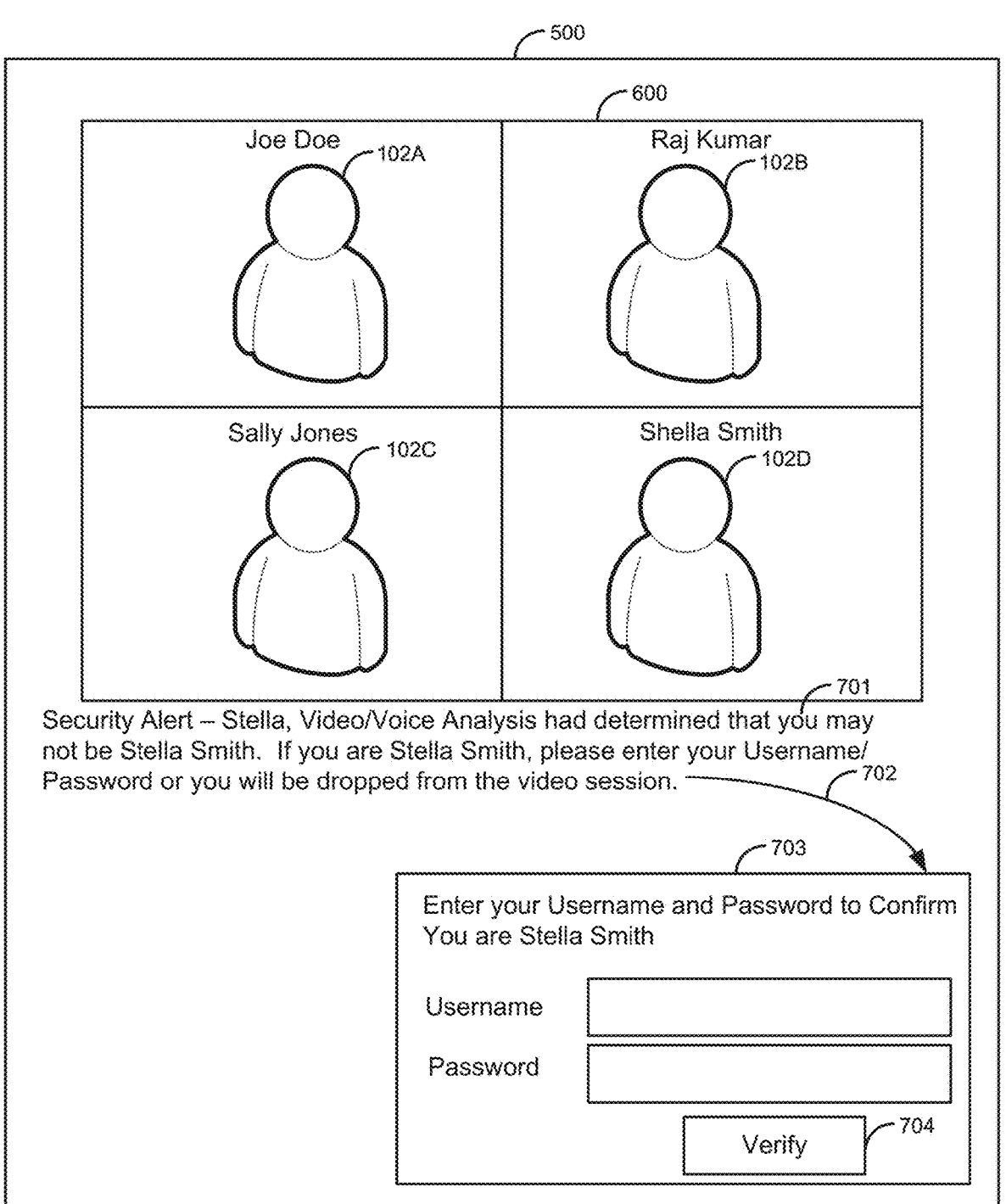
FIG. 7 is a diagram of a graphical user interface for a video communication session where a potential imposter is asked to provide user login credentials in order to stay in the video communication session.

FIG. 7 is a diagram of a Graphical User Interface (GUI) 500 for a video communication session 600 where a potential imposter is asked to provide user login credentials in order to stay in the video communication session 600. In FIG. 7, the GUI 500 comprises the video communication session 600, a security alert message 701, and an authentication window 702.

The video communication session 600 of FIG. 7 comprises four users: Joe Doe 102A, Raj Kumar 102B, Sally Jones 102C, and Stella Smith 102D. The in FIG. 7, the GUI 500 is being displayed to the user Stella Smith 102D. The communication analysis module 124 has determined that the user Stella Smith 102D may be a potential imposter. As a result of the analysis, the security alert message 701 is displayed to the user Stella Smith 102D. The security alert message 701 tells the user Stella Smith 102D (or the potential imposter) that the voice/video analysis has determined that the user Stella Smith 102D may be an imposter. The security alert message 701 also requests that the user Stella Smith 102D enter her username and password or be dropped from the video communication session.

Also, as a result of the analysis, the authentication window 703 is displayed in step 702. To stay in the video communication session 600, the user Stella Smith 102D must enter a valid username and password in the authentication window 703. After entering the valid username and password in the authentication windows 703, the user Stella Smith 102D then clicks on the verify button 704 and the user Stella Smith 102D remains in the video communication session 600. Otherwise, if the username and password are not valid or the verify button 704 is not clicked, the user Stella Smith 102D will be removed from the video communication session 600. For example, the user Stella Smith 102D may be given 30 seconds to enter a valid username and password and click on the verify button 704 before being dropped from the video communication session 600.

Figure 8:
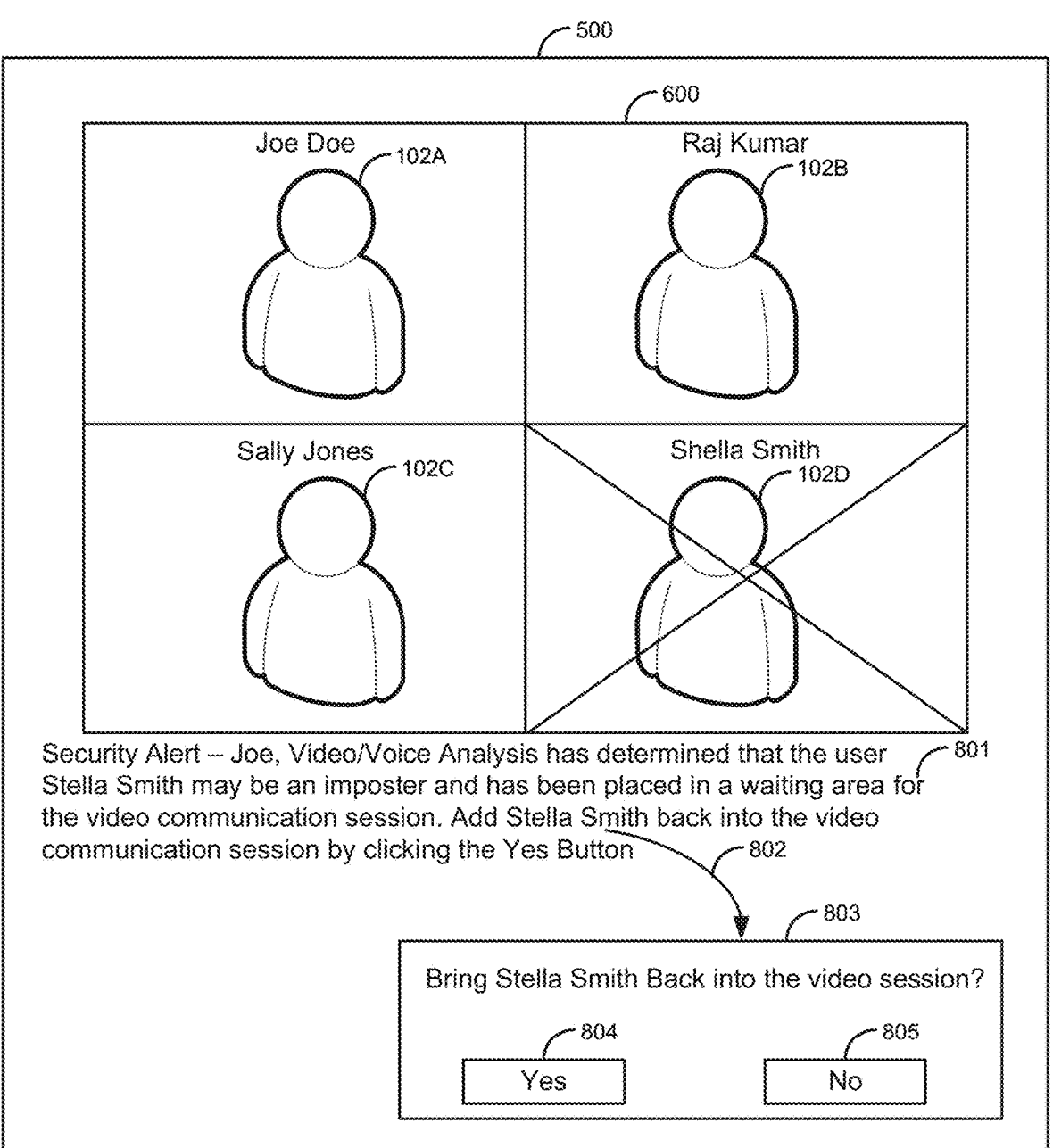
FIG. 8 is a diagram of a graphical user interface for video communication session where a potential imposter is placed in a waiting area.

FIG. 8 is a diagram of a Graphical User Interface (GUI) 500 for video communication session 600 where a potential imposter is placed in a waiting area. In FIG. 8, the GUI 500 comprises the video communication session 600, a security alert message 801, and bring user back window 803.

The video communication session 600 of FIG. 8 comprises four users: Joe Doe 102A, Raj Kumar 102B, Sally Jones 102C, and Stella Smith 102D. The GUI 500 is being displayed to the user Joe Doe 102A. The communication analysis module 124 has determined that the user Stella Smith 102D may be a potential imposter. As a result of the analysis, the video communication session 600 shows the user Stella Smith being crossed out, meaning that the user Stella Smith 102D has been placed in the waiting area (where she no longer is in the video communication session 600). In addition, the security alert message 801 is displayed to the user Joe Doe 102A. The security alert message 801 tells the user Joe Doe 102A that the voice/video analysis has determined that the user Stella Smith 102D may be an imposter and has been placed in a waiting area for the video communication session 600.

In addition, based on the analysis, the bring user back window 803 is displayed to the user Joe Doe 102A in step 802. The user Joe Doe 102A can then add the user Stella Smith 102D back into the video communication session 600 by clicking on the yes button 804. Otherwise, the user Joe Doe 102A may elect not to bring the user Stella Smith 102D back into the video communication session 600 by clicking on the no button 805. By clicking on the no button 805, the user Stella Smith 102D may be dropped from the video communication session 600.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system comprising:
a microprocessor; and
a computer readable medium, coupled with the microprocessor and comprising microprocessor readable and executable instructions that, when executed by the microprocessor, cause the microprocessor to:
gather language used by a first specific user in a first specific context, the first specific context comprising the first specific user, a first specific recipient, and a first specific type of communication, wherein the language used by the first specific user in the first specific context is language gathered from a plurality of previously captured electronic communication sessions having the first specific context;
train a first machine learning process based on the language gathered from the plurality of previously captured electronic communication sessions to provide a first trained leaning process corresponding to the first specific context, the first trained learning process being different from a second trained learning process trained based on language from a plurality of previously captured electronic communication sessions having a second specific context, the second specific context comprising the first specific user and one or more of a different second specific recipient and a different second specific type of communication;
in response to detecting an electronic communication session identifying the first specific user, map a context of the detected electronic communication session to the first specific context rather than the second specific context;
use, in real-time, the first trained machine learning process and not the second trained learning process to determine a likelihood that the first specific user is actually participating in the detected electronic communication session or a likelihood that a potential imposter is likely posing as the first specific user in the detected electronic communication session;
in response to determining based on the determined likelihood that the potential imposter is likely posing as the first specific user in the detected electronic communication session, take an action to secure the detected electronic communication session.

2. The system of claim 1, wherein the second specific context comprises the second specific recipient and the second specific type of communication, wherein the first specific context is text communications, and wherein the plurality of previously captured electronic communication sessions comprises a plurality of previously captured electronic text communication sessions.

3. The system of claim 2, wherein the language used by the first specific user in the first specific context comprises: acronyms used by the first specific user, profanity used by the first specific user, lack of use of specific words by the first specific user, lack of acronyms used by the first specific user, lack of profanity used by the first specific user, use of specific emojis by the first specific user, lack of emojis by the first specific user, use of a signature, lack of use of the signature, use of attachments, and lack of use of the attachments.

4. The system of claim 2, wherein the first specific type of communication is email communications and wherein determining that potential imposter is likely posing as the first specific user in the electronic communication session further comprises identifying at least one of:
a country of one or more addresses of one or more email servers typically used by the first specific user; and
a country of the one or more addresses of the one or more email servers used in the electronic communication session.

5. The system of claim 1, wherein the first specific context is voice communications and wherein the plurality of previously captured electronic communication sessions comprises a plurality of previously captured electronic voice communication sessions.

6. The system of claim 5, wherein the language used by the first specific user in the first specific context comprises: acronyms used by the first specific user, profanity used by the first specific user, lack of use of specific words by the first specific user, lack of acronyms used by the first specific user, lack of profanity used by the first specific user, an inflection by the first specific user, an accent of the first specific user, and a loudness of the first specific user.

7. The system of claim 5, wherein the second specific context comprises the first specific recipient and the second specific type of communication and wherein the first specific context is voicemail communications.

8. The system of claim 1, wherein the second specific context comprises the first specific type of communication and the second specific recipient, wherein the first specific context is video communications, and wherein the plurality of previously captured electronic communication sessions comprises a plurality of previously captured electronic video communication sessions.

9. The system of claim 8, wherein the language used by the first specific user in the first specific context comprises: acronyms used by the first specific user, profanity used by the first specific user, lack of use of specific words by the first specific user, lack of acronyms used by the first specific user, lack of profanity used by the first specific user, an inflection by the first specific user, an accent of the first specific user, a loudness of the first specific user, a type of gesture used by the first specific user, a mannerism used by the first specific user, a facial motion used by the first specific user, a look when speaking specific words by the first specific user, a change in the first specific user's face over time, glasses used by the first specific user, and a haircut by the first specific user.

10. The system of claim 1, wherein the language gathered from the plurality of previously captured electronic communication sessions comprises language of one or more other specific users and wherein the language of the one or more other specific users is filtered out of the plurality of previously captured electronic communication sessions before training of the first machine learning process.

11. The system of claim 1, wherein the action comprises at least one of the following actions:

preventing the potential imposter from being further involved in the detected electronic communication session;

automatically dropping the potential imposter from the detected electronic communication session;

requesting the potential imposter to provide one or more login credentials to verify that the potential imposter is actually the first specific user;

requesting another user in the detected electronic communication session to provide the one or more login credentials to respond to the potential imposter;

notifying the another user in the detected electronic communication session of the potential imposter;

flagging the electronic communication session as insecure or potentially insecure;

automatically dropping the potential imposter from the electronic communication sessions and allowing the another user to allow the potential imposter back into the detected electronic communication session; and placing the potential imposter in a waiting area.

12. The system of claim 1, wherein the first and second specific types of communication are different ones of a text communication, voice communication, and video communication and wherein the first and second specific contexts are different from each other and are associated with different pluralities of previously captured electronic communication sessions.

13. A method comprising:

gathering, by a microprocessor, language used by a first specific user in a first specific context, the first specific context comprising the first specific user, a first specific recipient, and a first specific type of communication, wherein the language used by the first specific user in the first specific context is language gathered from a plurality of previously captured electronic communication sessions having the first specific context;

training, by the microprocessor, a first machine learning process based on the language gathered from the plurality of previously captured electronic communication sessions to provide a first trained leaning process corresponding to the first specific context, the first trained learning process being different from a second trained learning process trained based on language from a plurality of previously captured electronic communication sessions having a second specific context, the second specific context comprising the first specific user and one or more of a different second specific recipient and a diff rent second specific type of communication;

in response to detecting an electronic communication session identifying the first specific user, mapping a context of the detected electronic communication to the first specific context rather than the second specific context;

using, in real-time, by the microprocessor, the first trained machine learning process and not the second trained learning process to determine a likelihood that the first specific user is actually participating in the detected electronic communication session or a likelihood that a potential imposter is likely posing as the first specific user in the detected electronic communication session;

in response to determining based on the determined likelihood that the potential imposter is likely posing as the first specific user in the detected electronic communication session, taking, by the microprocessor, an action to secure the detected electronic communication session.

14. The method of claim 13, wherein the second specific context comprises the first specific user and the second specific recipient and second specific type of communication, wherein the first specific context is text communications, and wherein the plurality of previously captured electronic communication sessions comprises a plurality of previously captured electronic text communication sessions.

15. The method of claim 14, wherein the language used by the first specific user in the first specific context comprises: acronyms used by the first specific user, profanity used by the first specific user, lack of use of specific words by the first specific user, lack of acronyms used by the first specific user, lack of profanity used by the first specific user, use of specific emojis by the first specific user, lack of emojis by the first specific user, use of a signature, lack of use of the signature, use of attachments, and lack of use of the attachments.

16. The method of claim 13, wherein the second specific context comprises the first specific recipient and the second specific type of communication, wherein the first specific context is voice communications and wherein the plurality of previously captured electronic communication sessions comprises a plurality of previously captured electronic voice communication sessions.

17. The method of claim 13, wherein the second specific context comprises the first specific type of communication and the second specific recipient, wherein the first specific context is video communications, and wherein the plurality of previously captured electronic communication sessions comprise a plurality of previously captured electronic video communication sessions.

18. The method of claim 13, wherein the language gathered from the plurality of previously captured electronic communication sessions comprises language of one or more other specific users and wherein the language of the one or more other specific users is filtered out of the plurality of previously captured electronic communication sessions before training the first machine learning process.

19. The method of claim 13, wherein the first and second specific types of communication are different ones of a text communication, voice communication, and communication, wherein the first and second specific contexts are different from each other and are associated with different pluralities of previously captured electronic communication sessions and wherein the action comprises at least one of the following actions:

preventing the potential imposter from being further involved in the detected electronic communication session;

automatically dropping the potential imposter from the detected electronic communication session;

requesting the potential imposter to provide one or more login credentials to verify that the potential imposter is actually the first specific user;

requesting another user in the detected electronic communication session to provide the one or more login credentials to respond to the potential imposter;

notifying the another user in the detected electronic communication session of the potential imposter;

flagging the detected electronic communication session as insecure or potentially insecure;

automatically dropping the potential imposter from the detected electronic communication sessions and allowing the another user to allow the potential imposter back into the detected electronic communication session; and placing the potential imposter in a waiting area.

20. A non-transient computer readable medium having captured thereon instructions that cause a processor to execute a method, the method comprising instructions to:

gather language used by a first specific user in a first specific context, the first specific context comprising the first specific user, a first specific recipient, and a first specific type of communication, wherein the language used by the first specific user in the first specific context is language gathered from a plurality of previously captured electronic communication sessions having the first specific context;

train a first machine learning process based on the language gathered from the plurality of previously captured electronic communication sessions to provide a first trained leaning process corresponding to the first specific context, the first trained learning process being different from a second trained learning process trained based on language from a plurality of previously captured electronic communication sessions having a second specific context, the second specific context comprising the first specific user and one or more of a different second specific recipient and a different second specific type of communication, wherein the first and second specific types of communication are different ones of a text communication, voice communication, and video communication and wherein the first and second specific contexts are different from each other and are associated with different pluralities of previously captured electronic communication sessions;

in response to electronic communication session identifying the first specific user, map a context of the detected electronic communication to the first specific context rather than the second specific context;

use, in real-time, the first trained machine learning process and not the second trained learning process to determine a likelihood that the first specific user is actually participating in the detected electronic communication session or a likelihood that a potential imposter is likely posing as the first specific user in the detected electronic communication session;

in response to determining based on the determined likelihood that the potential imposter is likely posing as the first specific user in the detected electronic communication session, take an action to secure the detected electronic communication session.

\* \* \* \* \*